United States Patent Office 2,808,147
Patented Oct. 1, 1957

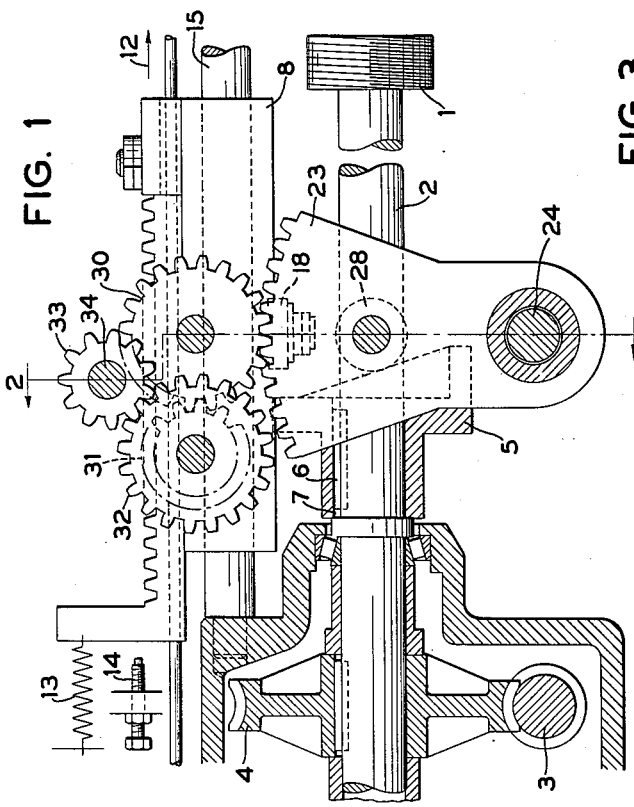

2,808,147

MECHANISMS FOR FORMING CYLINDRICAL WORK PIECES

Ernst Fritz Wilhelm Moeltzner, Berlin-Charlottenburg, Germany, assignor, by mesne assignments, to Landis Machine Company, Waynesboro, Pa., a corporation of Pennsylvania Application January 20, 1954, Serial No. 405,184

Claims priority, application Germany February 7, 1953

8 Claims. (Cl. 203—150)

This invention is an improvement on the subject matter of copending application Serial No. 372,373 filed August 4, 1953, which concerns a machine for operating upon cylindrical work pieces of smooth wire or bars, for producing headless screws, studs or the like, in which a feeding mechanism, provided with controllable clamping means is adjustable for length of stroke by means of a feed cam, which engages a roller mounted on the feeding carriage, and by means of a stop for limiting the return movement and a controllable clamping means is mounted on the shearing tool. In that machine the feeding carriage is controlled directly by the feed cam so that the maximum feed of the work piece is determined by the height of the feed cam. The feed is limited by the constructional dimensions possible. Therefore only relatively short strokes of the feeding carriage are possible, using this method. The work pieces cut to length from the wire can have lengths of up to about 70 mm. using this feeding mechanism. It frequently happens, however, that longer work pieces are to be rolled on a portion of their lengths or are to be through-rolled. The object of the invention is to create a suitable feeding mechanism which will convey wire from the reel or bars from a magazine, in long or short lengths, adjustable as desired, to the shearing tool and thence to the rolling tools of the thread rolling machine.

According to the invention, the feed cam selectively engages the roller mounted on the feeding carriage or transmission gears for displacing the feeding carriage.

A suitable embodiment is one in which the feed cam contacts a rotatably journalled gear segment of a change gear mechanism which meshes with a longitudinal rack on the feeding carriage. In this construction, the gear segment is mounted outside the range of the feed cam and is provided with an interchangeable roller lying within the reach of the feed cam, which roller is mounted at right angles to the roller on the feeding carriage. Consequently, the feed cam can be set around 90° and has two keyways 90° apart for a key mounted in the drive shaft.

The advantage of the invention resides in the large range of adjustment from zero to, for example, 500 mm. or more, over which range the stroke length can be adjusted. The mechanism is adaptable to all requirements by a simple exchange of gears of the change gear mechanism, in case the direct control of the carriage by the feed cam is not sufficient. The selective connection of one of the two kinds of feed is extremely simple. If it is desired to connect the transmission gearing, it is necessary only to set the roller of this gearing in contact with the feed cam, while the roller connected to the feeding carriage remains in place because it does not interfere with the greater feeding movement of the carriage.

A further simplification of the feed mechanism resides in the fact that the clamping means mounted on the feeding carriage is automatic and has two spring-loaded clamping levers which secure the work piece during the feed stroke and which, during the return movement of the carriage, release the work piece which is at that time clamped at the shearing tool. Thereby those cams are eliminated which were formerly required for clamping and releasing and which would have dimensions impermissibly large for the construction, in the case of longer strokes. The structural dimensions of the feeding mechanism with transmission gearing are not increased by the automatic clamping levers. Furthermore; the mechanism is simplified by elimination of the cams.

The subject matter of the invention is shown in an exemplary embodiment in the drawing, in which:

Figure 1 is an elevation of the feeding mechanism with transmission gearing,

Figure 2 is a section along line 2—2 of Fig. 1,

Figure 3 is a plan view of a part of Fig. 1 and

Figure 4 is a section along line 4—4 of Fig. 3.

The threading roll 1 is mounted on the operating shaft 2, which is driven by the worm 3 of the drive motor, not shown, through the worm gear 4. The feed cam 5 is secured on the operating shaft by a key 6. The two keyways 7 are arranged at right angles to each other. The feeding carriage 8 carries the clamping levers 10 which are under the tension of springs 9 and which are rockable about the pins 11 and are self-clamping when the carriage is moved in the direction of the arrow 12. The carriage has the retracting spring 13. Its return movement is limited by the stop screw 14. In the direction of the arrow 12 the length of stroke is limited only in the path of the drive.

The feeding carriage 8 is guided on the cylindrical bars 15 and 16 and carries a stub shaft 17 on which the roller 18 is mounted. This is contacted directly by feed cam 5 as is the case in the subject matter of said application.

On its upper side, the feeding carriage carries the rack 20, which is secured by screws 19 and which has a longitudinal groove 21 in its bottom surface for the passage of the wire or bar 22. The change gear mechanism operating on the rack comprises the gear segment 23 which is rockable about the shaft 24 and for the purpose of such rocking movement, is secured to the journal 25 by screws 26. The gear segment is journalled axially stationary, so that it lies beyond the reach of the feed cam 5, and carries the roller 28 on the stub shaft 27. Shaft and roller can be removed. The gears 30 and 31, 32 are journalled in the brackets 29 of which only one is shown. The gear 31, 32 is formed as a duplex gear. The gear segment meshes with the gear 30 which meshes with the gear 31, 32. The gear 32 meshes with the gear 33 which is mounted on the shaft 34. The shaft 34 carries the gear 35 which meshes with the rack 20 of the feeding carriage.

The manner of operation is as follows:

The feeding mechanism operates selectively either with a direct feed via the roller 18 or through the transmission gearing via the roller 28. The roller 28 is removed when the mechanism operates with the direct feed. If the transmission gearing is used, the roller 28 is attached to the gear segment 23 and the cam 5 is turned 90° to maintain the same angular relationship between cam and roller. The gear segment 23 now operates the rack 20 of the feeding carriage, via the gears 30 through 33 and 35, and imparts to the rack a longer stroke corresponding to the transmission ratio. The end of the feed is determined by the maximum height of the feed cam 5 and the amplitude of the gear segment conditioned thereby, while the return movement is limited by the adjustable stop screw 14. When the carriage moves in the direction of the arrow 12, the clamping levers 10 clamp the wire 22 and advances it the preset length of stroke. Thereupon the wire is seized by a clamping means mounted at the shearing tool, so that the clamping levers 10 are automatically released upon rearward movement of the feeding carriage and re-clamp the wire and carry it forward when the feeding movement is resumed.

I claim:

1. Mechanism for feeding elongated stock comprising, a reciprocable grip assembly, a feed cam adapted to operate first and second cam followers, and separate means adapted to operatively connect said first and second cam followers, respectively, to said grip assembly, said connecting means being adapted to impart movements of different length to said grip assembly for a given movement of said feed cam.

2. The mechanism according to claim 1 wherein one of said separate connecting means comprises means mounting said first cam follower on said grip assembly to provide a direct drive between said feed cam and said grip assembly.

3. The mechanism according to claim 1 wherein one of said separate connecting means comprises a gear train, one element of which carries said second cam follower.

4. The mechanism according to claim 1 together with means independent of said connecting means for limiting the movement of said grip assembly.

5. Mechanism for feeding elongated stock comprising, a reciprocable grip assembly, a feed cam adapted to operate first and second cam followers, means on said grip assembly adapted to support said first cam follower whereby said grip assembly may be moved a predetermined distance by operation of said feed cam, and a gear train adapted to operatively connect said grip assembly and said second cam follower, said gear train being adapted to move said grip assembly a distance greater than said predetermined distance upon actuation of said feed cam.

6. Mechanism for feeding elongated stock comprising, a reciprocable grip assembly, rotary feed cam having an annular cam surface adapted to operate first and second cam followers mounted at spaced points around the circumference of said cam surface, a drive shaft, means adapted to selectively mount said feed cam on said drive shaft to dispose a predetermined portion of its cam surface opposite said first and second cam followers, separate means adapted to operatively connect said first and second followers, respectively, to said grip assembly, said separate means being adapted to impart different movements to said grip assembly for a given movement of said cam.

7. Mechanism for feeding elongated stock comprising, a reciprocable grip assembly, a driven rotary feed cam adapted to operate first and second cam followers, means adapted to mount said first follower on said grip assembly, a rack on said grip assembly, a gear segment adapted to detachably carry said second cam follower, a gear train operatively connecting said rack and said gear segment, said gear train being adapted to move said grip assembly a distance greater than the distance said second cam follower is moved by said cam in the rotation thereof, and means independent of said cam for limiting the movement of said grip assembly.

8. Mechanism for feeding elongated stock comprising, a grip assembly, a driven rotary feed cam having an annular cam surface adapted to operate first and second cam followers, means for mounting said first cam follower on said grip assembly for rotation about a predetermined axis and opposite said cam surface, a gear segment adapted to detachably support said second cam follower for rotation about an axis normal to said predetermined axis and opposite said cam surface, a drive shaft, means adapted to selectively mount said feed cam on said drive shaft in two positions to selectively dispose a predetermined portion of said cam surface opposite said first and second followers, respectively, a rack on said grip assembly, and a gear train operatively connecting said rack and said gear segment, said gear train being adapted to move said grip assembly a distance greater than the distance said grip assembly is moved by a given movement of said feed cam.

References Cited in the file of this patent

UNITED STATES PATENTS

| | | |
|---|---|---|
| 343,288 | Willoughby | June 8, 1886 |
| 395,890 | Freeman | Jan. 8, 1889 |
| 662,662 | Anthony | Nov. 27, 1900 |
| 786,353 | Gabriel | Apr. 4, 1905 |
| 911,911 | Sisson | Feb. 9, 1909 |
| 914,668 | Olsson | Mar. 9, 1909 |
| 1,212,605 | Brightman | Jan. 16, 1917 |
| 1,670,006 | Prim | May 15, 1928 |